US 9,026,860 B2

United States Patent
Akirav et al.

(10) Patent No.: US 9,026,860 B2
(45) Date of Patent: May 5, 2015

(54) SECURING CRASH DUMP FILES

(75) Inventors: Shay Haim Akirav, Petach-Tikva (IL); Roman Barsky, Tel Aviv (IL); Rafael Buchbinder, Tel Aviv (IL); Dan Melamed, Tel Aviv (IL)

(73) Assignee: International Business Machines Corpoation, Armonk, NY (US)

( * ) Notice: Subject to any disclaimer, the term of this patent is extended or adjusted under 35 U.S.C. 154(b) by 199 days.

(21) Appl. No.: 13/562,836

(22) Filed: Jul. 31, 2012

(65) Prior Publication Data

US 2014/0040671 A1 Feb. 6, 2014

(51) Int. Cl.
G06F 11/00 (2006.01)
G06F 11/16 (2006.01)
G06F 11/34 (2006.01)
G06F 11/07 (2006.01)

(52) U.S. Cl.
CPC .......... *G06F 11/1612* (2013.01); *G06F 11/348* (2013.01); *G06F 11/0727* (2013.01); *G06F 11/0778* (2013.01)

(58) Field of Classification Search
USPC .......................................................... 714/45
See application file for complete search history.

(56) References Cited

U.S. PATENT DOCUMENTS

| 5,790,777 | A  | * | 8/1998  | Izuta et al. ..................... 714/45 |
| 5,999,933 | A  | * | 12/1999 | Mehta .................................. 1/1 |
| 6,192,483 | B1 |   | 2/2001  | Moiin et al. |
| 7,491,690 | B2 |   | 2/2009  | Stupp et al. |
| 7,526,758 | B2 | * | 4/2009  | Hasse et al. .................... 717/133 |
| 7,739,541 | B1 |   | 6/2010  | Rao et al. |
| 8,069,371 | B2 | * | 11/2011 | Sengupta et al. ............... 714/37 |
| 8,132,057 | B2 | * | 3/2012  | Jann et al. .................... 714/38.1 |
| 8,375,386 | B2 | * | 2/2013  | Hendel ............................. 718/1 |
| 8,621,263 | B2 | * | 12/2013 | Bae et al. ..................... 714/4.21 |
| 8,621,282 | B1 | * | 12/2013 | Mixter et al. ............... 714/38.11 |
| 8,805,855 | B2 |   | 8/2014  | Sasson et al. |
| 2006/0242453 | A1 | * | 10/2006 | Kumar et al. ...................... 714/4 |
| 2008/0155315 | A1 | * | 6/2008  | Gunda et al. ...................... 714/8 |
| 2011/0004780 | A1 |   | 1/2011  | Hirata |
| 2011/0289343 | A1 | * | 11/2011 | Schaefer et al. ............... 714/4.1 |
| 2011/0289344 | A1 | * | 11/2011 | Bae et al. ...................... 714/4.2 |
| 2013/0132762 | A1 | * | 5/2013  | Bae et al. ...................... 714/4.2 |
| 2013/0139219 | A1 | * | 5/2013  | Cai .................................. 726/3 |
| 2013/0152087 | A1 | * | 6/2013  | Hendel ............................. 718/1 |
| 2014/0040671 | A1 | * | 2/2014  | Akirav et al. .................... 714/45 |
| 2014/0052691 | A1 | * | 2/2014  | Sasson et al. ................. 707/625 |
| 2014/0059004 | A1 | * | 2/2014  | Sasson et al. ................. 707/625 |
| 2014/0081927 | A1 | * | 3/2014  | Lipcon et al. ................. 707/692 |
| 2014/0089724 | A1 | * | 3/2014  | Akirav et al. ................ 714/4.11 |

OTHER PUBLICATIONS http://lists.infradead.org/pipermail/kexec/2008-April/001561.html.*

* cited by examiner

*Primary Examiner* — Amine Riad
(74) *Attorney, Agent, or Firm* — Griffiths & Seaton PLLC (57) ABSTRACT

In a computer storage system, crash dump files are secured without power fencing in a cluster of a plurality of nodes connected to a storage system. Upon an occurrence of a panic of a crashing node and prior to receiving a panic message of the crashing node by a surviving node loading, in the cluster, a capturing node to become active, prior to a totem token being declared lost by the surviving node, for capturing the crash dump files of the crashing node, while manipulating the surviving node to continue to operate under the assumption the power fencing was performed on the crashing node.

16 Claims, 4 Drawing Sheets

FIG. 4

SECURING CRASH DUMP FILES

BACKGROUND OF THE INVENTION

1. Field of the Invention

The present invention relates in general to computers, and more particularly to securing crash dump files in a cluster of nodes connected to a storage system.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components. However, due to the various processing components and applications, the computer systems often encounter operations system crashes.

SUMMARY OF THE DESCRIBED EMBODIMENTS

With increasing demand for faster, more powerful and more efficient ways to store information, optimization of storage technologies is becoming a key challenge. As large scale, distributed data processing systems, such as in cloud computing, become more ubiquitous in the computer world, methods for providing enhanced functionality and greater up-time are required to continue to adequately serve commercial needs. As computing environments continue to evolve and become dispersed across geographical boundaries, being able to access all the information takes time and is cumbersome. With the increasing popularity of virtual and clustered environments, the problem is exacerbated. In this environment, one or more nodes within the cluster may experience an operating system crash. With the current technology, it may be required to load each system dump image one at a time on separate consoles or terminals in order to identify any relationships that could have caused a cluster wide or single node crash. In addition, any system crash must be investigated in order to get to its root cause, whether it is a cluster node or a stand-alone server. The fact that this problem occurs in clusters is only the extrapolation of system crashes in general, and is not necessarily affected by the cluster configuration. The clustering only makes it difficult to capture the image required for debugging, and the current technology is inefficient and prone to numerous errors. Thus, the present invention seeks to secure a dump file, despite the fact that the cluster is using power fencing as the method to avoid a split brain and delay the power fencing once the dump file is secured.

Accordingly, and in view of the foregoing, various exemplary method, system, and computer program product embodiments for securing crash dump files while avoiding power fencing, in a cluster of a plurality of nodes connected to a storage system are provided. In one embodiment, by way of example only, upon an occurrence of a panic of a crashing node and prior to receiving a panic message of the crashing node by a surviving node, loading, in the cluster, a capturing node to become active, prior to a totem token being declared lost by the surviving node, for capturing the crash dump files of the crashing node, while manipulating the surviving node to continue to operate under the assumption the power fencing was performed on the crashing node.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, with increasing demand for faster, more powerful and more efficient ways to store information, optimization of storage technologies is becoming a key challenge. In the event that one or more nodes within a networking cluster in a storage system experiences an operating system crash, a need exists to save a crash dump file of the operation systems memory in the event of a node crash.

In one embodiment, by way of example only, a physical memory (main memory) is mapped to virtual memory, which can be divided into regions such as a user space and a kernel space that may be included within each storage system in a networking cluster. The user space may be reserved for user mode programs. The kernel space may be reserved for running an operating system, such as Linux® OS, etc. The kernel space can include a memory space for an operational kernel of the operating system and can include a private and protected region of memory space that is reserved for executing a secondary new operating system for when an operating system of the node crashes (e.g., the secondary operation system may be different from or the same as the running operating system). When the operating system in the node experiences a crash, a new operating system may be booted from a capturing node, also known as a crash kernel and/or a capture kernel, which resides in the reserved private region of memory space. (It should be noted that once the OS crashes, there is an internal mechanism to dump the virtual memory (vm) file and load the secondary kernel on the same node, so in essence the node transforms itself to become the capturing node.) That mechanism loads the secondary kernel on the same node, so in essence the node transforms itself to become the capturing node. This secondary node is loaded and becomes active prior to a totem token (cluster heartbeat) being declared lost. This secondary kernel is chosen to be a thin kernel that is loaded and becomes active (e.g., boots up) within at most 3 seconds. The operating systems may provide a crash recovery mechanism that boots a crash kernel in a new operating system using the protected region of memory. The protected region of memory that stores the crash kernel is non-writable during operation of the initial operating system. Also, the secondary kernel is not connected to the cluster network's storage system. By restricting the secondary kernel from gaining access to the storage system, unsynchronized access to the storage system is prevented in order to prevent data corruption. When the initial operating system crashes, the new operating system can then reinitialize the computing system hardware without modifying the state of the crashed operating system memory.

In one embodiment, for example, Linux® OS may be used for providing a crash recovery using a 'dump' (e.g., "kdump") that executes from a new operating system and collects state data (e.g., virtual memory (vm) core dump file) for the crashed operating system (the first operational kernel) for post-mortem analysis. The secondary kernel is loaded into the cluster to communicate with the crashing node (e.g., crashing kernel) in order to capture the dump image. The booting of the second kernel requires a sufficient amount of memory space to boot from, and thus the first operational kernel sets aside (reserves) memory for the second kernel. The reserved memory space for the second kernel is protected from general use and is not available during normal operation of the initial operating system. The secondary kernel has a reserved space in memory; it differs from the run-time kernel and contains different kernel modules. For example, 128 megabytes (MB) of memory space may be required. Immediately when the kernel is panicked the secondary kernel is loaded with network drivers to allow accessing the internal cluster network between the nodes (e.g., loaded and becoming active in less than 3 seconds).

However, the Linux® OS, if used, is limited in solving the capturing of the crash dump file. The Linux® OS, which is based on power fencing, often times results in the crash image not being dumped since by the time a secondary kernel boots, the failed node will be fenced. It should be noted that this is not a Linux limitation. The clustering is a separate package, provided by Red Hat, on top of the native OS. It is the Red Hat clustering recommended method to use power fencing, as opposed to other methods. (Fencing is the process of isolating a node of a computer cluster when a node appears to be malfunctioning.) The only method the Linux® OS provides is an option to configure the "post_fail_delay" parameter of the cluster configuration (cluster.conf) file, to a value that is high enough by trial and error. The post_fail_delay parameter tells the cluster management how long it should wait after the heartbeat timeout expires. If, for example the timeout is set to 5 seconds, and the post_fail_delay is set to 7 seconds, the timeout will expire after 5 seconds, but the cluster management on the surviving node will wait another 7 seconds before it will fence the failed node. However, if the RAM size is large enough, it may take a very long time (30-40 minutes) to complete the crash dump, which cannot be acceptable in the cluster configuration.

Thus, in order to address the inefficiencies of capturing a crash dump file of an operating system, the illustrated embodiments of the present invention as mentioned above, provide a solution for securing crash dump files without power fencing, in a cluster of a plurality of nodes connected to a storage system. In one embodiment, by way of example only, upon receiving a panic message of a crashing node by a surviving node, a capturing node is loaded into the cluster to become active, prior to a totem token being declared lost by a surviving node or before a time out of the totem token occurs, for capturing the crash dump files of the crashing node, while manipulating the surviving node to continue to operate under the assumption the power fencing was performed on the crashing node. Thus, the illustrated embodiments, as will be described below, guarantee that for any clustered system, the kdump will be able to complete the crash dump without being fenced, and without jeopardizing the integrity of the cluster.

Figure 1:
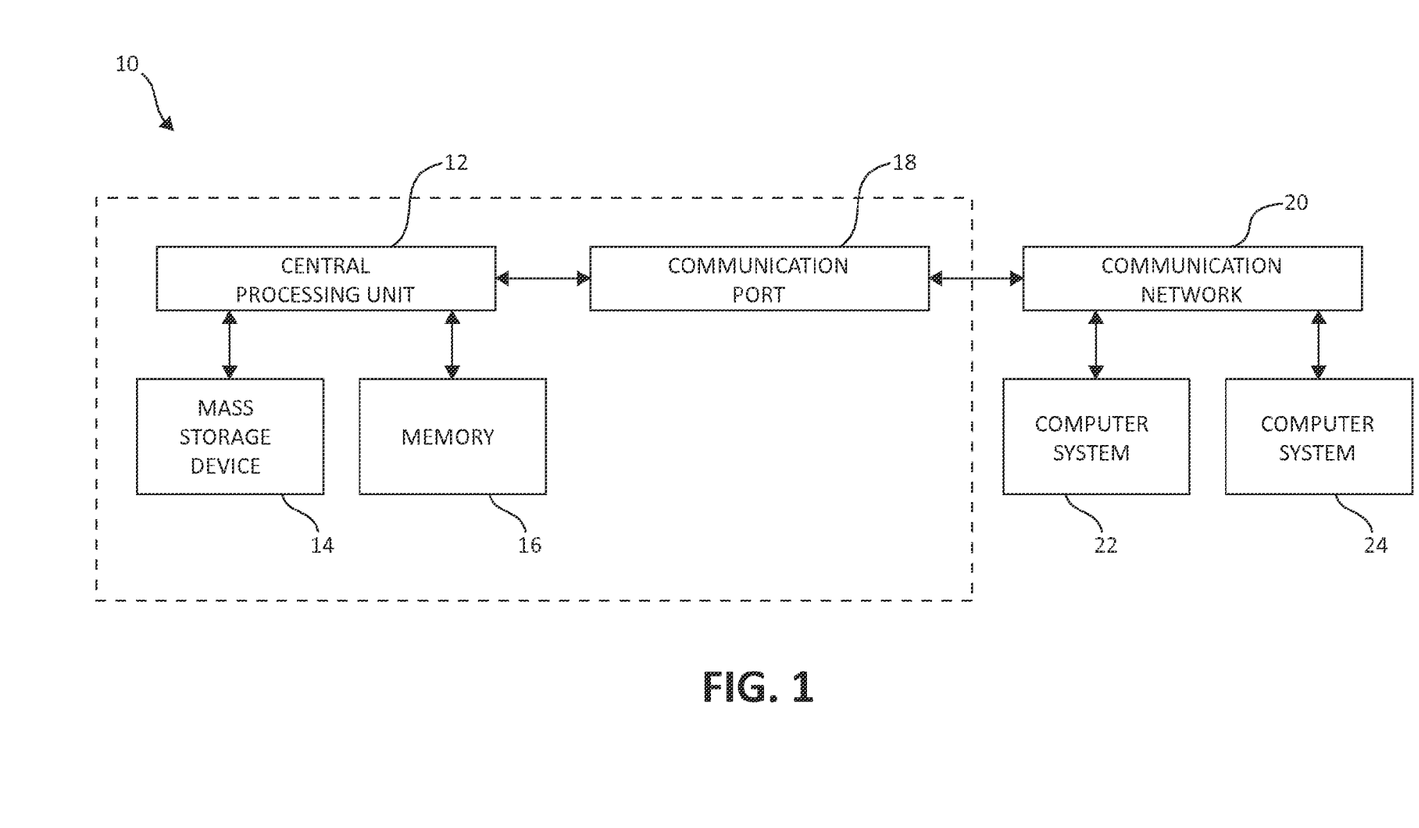
FIG. 1 is a block diagram illustrating a computing system environment having an example storage device in which aspects of the present invention may be realized.

Turning now to FIG. 1, exemplary architecture 10 of data storage systems (e.g., virtual tape systems) in a computing environment are depicted. The computer system 10 includes central processing unit (CPU) 12, which is connected to mass storage device(s) 14 and memory device 16. Mass storage devices can include hard disk drive (HDD) devices, solid-state devices (SSD) etc, which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
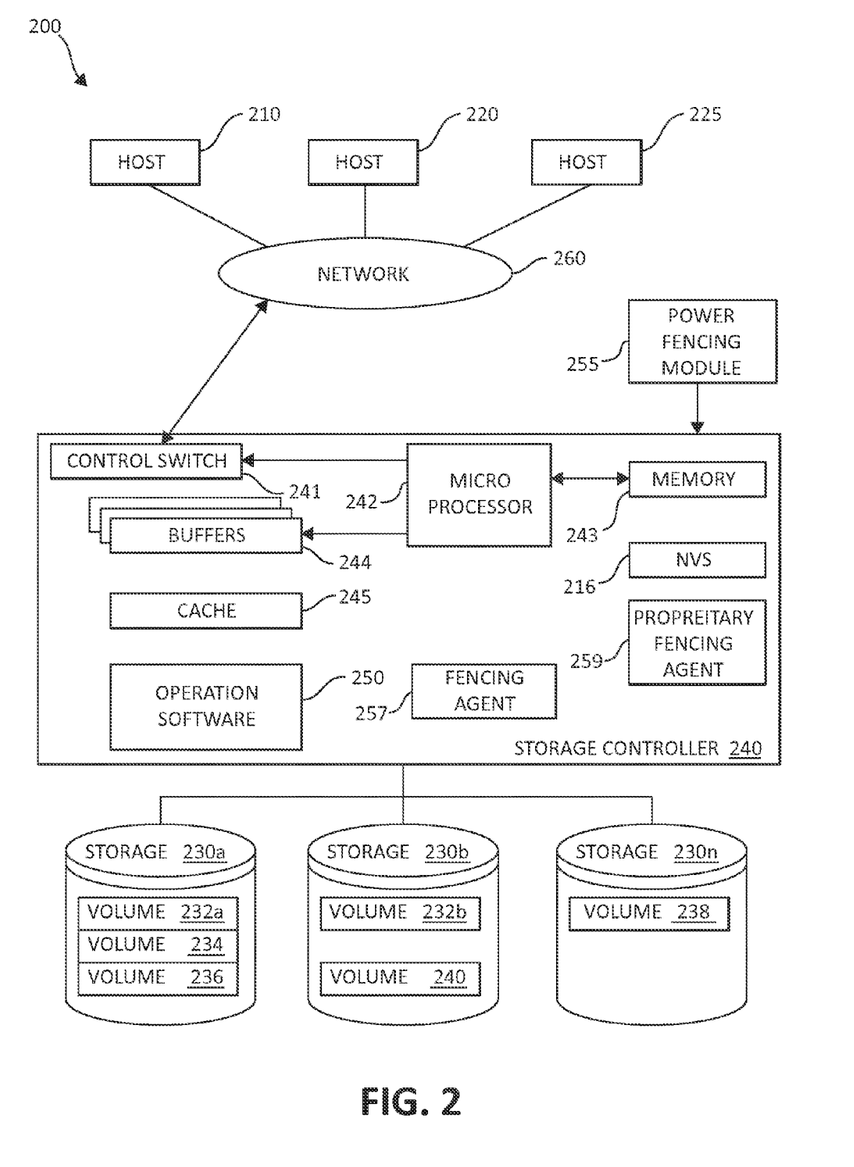
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention in a computing environment. In one embodiment, system memory 243 includes, is associated, or is in communication with the operation software 250 for in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. It should be noted that although most storage operations are, in fact, write and read requests, there are other types of operations, such as an inquiry command. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230*a*, 230*b* and 230*n* are shown as ranks in data storage system 200, and are referred to herein as rank 230*a*, 230*b* and 230*n*. Ranks may be local to data storage system 200, or may be located at a physically remote location. In other words, a local storage controller may connect with a remote storage controller and manage storage at the remote location. Rank 230*a* is shown configured with two entire volumes, 234 and 236, as well as one partial volume 232*a*. Rank 230*b* is shown with another partial volume 232*b*. Thus volume 232 is allocated across ranks 230*a* and 230*b*. Rank 230*n* is shown as being fully allocated to volume 238—that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a power fencing module 255, a fencing agent 257, and a proprietary fencing agent 259 in a computing environment. The power fencing module 255, the fencing agent 257, and the proprietary fencing agent 259 may work in conjunction with each and every component of the storage controller 240, the hosts 210, 220, 225, and storage devices 230. The power fencing module 255, the fencing agent 257, and the proprietary fencing agent 259 may be structurally one complete module or may be associated and/or included with other individual modules. The power fencing module 255, the fencing agent 257, and the proprietary fencing agent 259 may also be located in the cache 245 or other components of the storage controller 240 to accomplish the purposes of the present invention. In one embodiment, the power fencing module 255 is a single, external, block that is shared by all the nodes in the cluster. The power fencing module 255 is a physical power switch, from which the cluster nodes retrieves power feeds. The software components that operate it are included in the various fence agents, 257 and 259. Because the power fencing module 255 is a physical entity, the power fencing module 255 may not be located in the cache, as the fencing agent 257 can, and may be separately located and positioned.

The storage controller 240 may be constructed with a control switch 241 for controlling the fibre channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, the power fencing module 255, the fencing agent 257, and the proprietary fencing agent 259 on which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the power fencing module 255, the fencing agent 257, and the proprietary fencing agent 259 are in communication with each other and may be separate or one individual component(s). Also, several if not all of the components, such as the operation software 250 may be included with the memory 243. Each of the components within the devices shown may be linked together and may be in communication with each other for purposes suited to the present invention.

As will be illustrated below in FIGS. 3-4, in one embodiment, by way of example only, two layers that, combined, can guarantee the crash dump will succeed without being power fenced. First, the capturing kernel (secondary kernel) is chosen to be a thin kernel that boots within at most 3 seconds, and therefore can complete the capturing kernel boot before a totem token reaches a timeout. (It should be noted that a totem may be the core membership/messaging code, based on the published totem algorithm for reliable group communication. A totem token is circulated among all members; if one member fails, a totem token timeout will be detected and the remaining nodes will reconfigure the cluster membership. A totem implements "virtual synchrony" (VS), which is for replicating state across a cluster of nodes. VS (totem) guarantees the ordering of cluster messages and configuration changes, such that all nodes see all messages and changes in the same order.)

As a result of the capturing kernel booting before a totem token reaches a timeout, the capturing kernel is running before the token is declared as lost by the surviving node. The capturing kernel also has a boot disk module in the capturing kernel's initial ramdisk "initrd" image, so the capturing kernel has instant access to the boot drive where the kernel dump image will be saved to, in one example, as well as the ability to use the cluster network. Theoretically, the kernel dump image may have a separate disk drive to serve as the file system to contain the dump file. (The initial ramdisk is a scheme for loading a temporary file system into memory in the boot process of a kernel.) The second layer consists of a proprietary fence agent, configured in the cluster configuration file, as the first fence agent in the hierarchy, before the fence agent that connects to the power fence device. The crashing node notifies the proprietary fencing agent that the crashing node is starting a kernel crash procedure through the cluster network. Once a surviving node (e.g., the surviving node may be one or more of the nodes within the cluster) is notified and when the totem token is declared as lost, the fence agent will be called by a fenced daemon of the surviving node, and will return a successful exit code, although no fencing will actually take place. From that point on, the surviving node will run under the assumption the crashed node has been fenced, and crashed node will continue with dumping the crash image, without accessing any cluster shared resource, and will reboot once the dump is complete.

Figure 3:
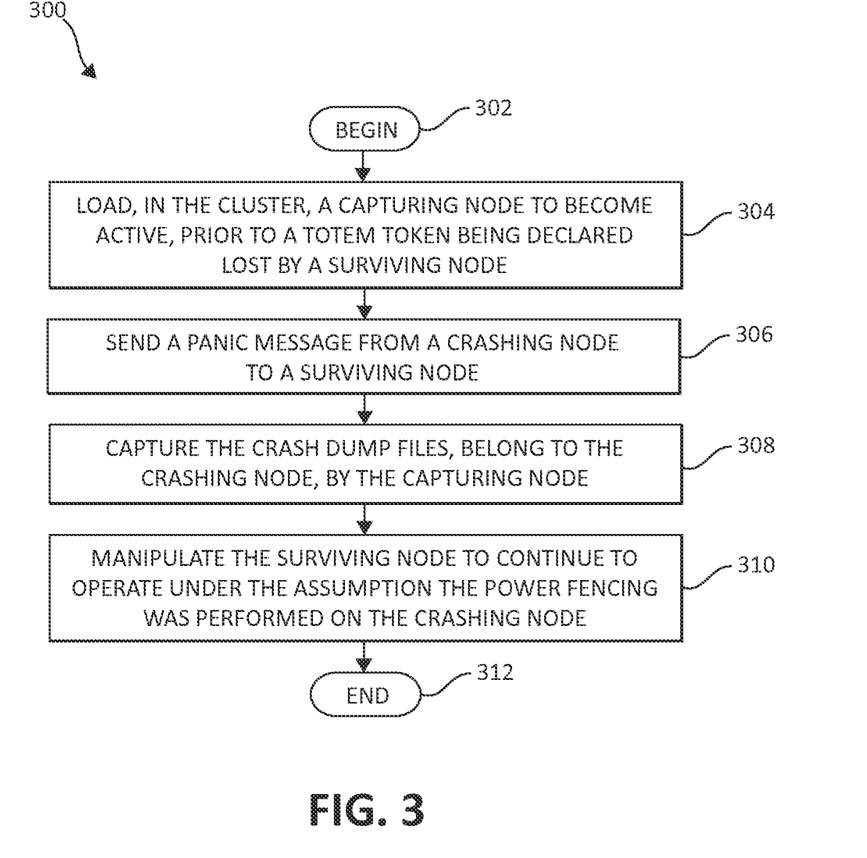
FIG. 3 is a flowchart illustrating an exemplary method for securing crash dump files without power fencing in a cluster of a plurality of nodes connected to a storage system.

Turning now to FIG. 3, a flowchart illustrating an exemplary method 300 for securing crash dump files without power fencing in a cluster of a plurality of nodes connected to a storage system is depicted. The method 300 begins (step 302) by loading, in the cluster, a capturing node to become active, prior to a totem token being declared lost by a surviving node (step 304). The surviving node receives a panic message from a crashing node (step 306). In other words, first, the crashing node, using the kdump mechanism, loads the crash kernel. Then, the method 300 will send a message to the surviving node, before the token is declared lost. Once the surviving node declares the token lost, it will then call the fence agent, however, since it previously got the panic message from the failed node, the proprietary fence agent will return success without actually fencing the failed node. It should be noted that an option is available to load a secondary kernel that becomes active only when a main kernel or a crashing kernel is panicked. Once a secondary kernel is up and running, the Kernel opens the opportunity to communicate between the nodes and control the fencing. Immediately when the kernel is panicked the secondary kernel is loaded with network drivers to allow accessing the internal cluster network between the nodes (e.g., loaded and becoming active in less than 3 seconds). The method 300 captures the crash dump files belonging to the crashing node (step 308). The surviving node is manipulated to continue to operate under the assumption the power fencing was performed on the crashing node (step 310). The method 300 ends (step 312).

Figure 4:
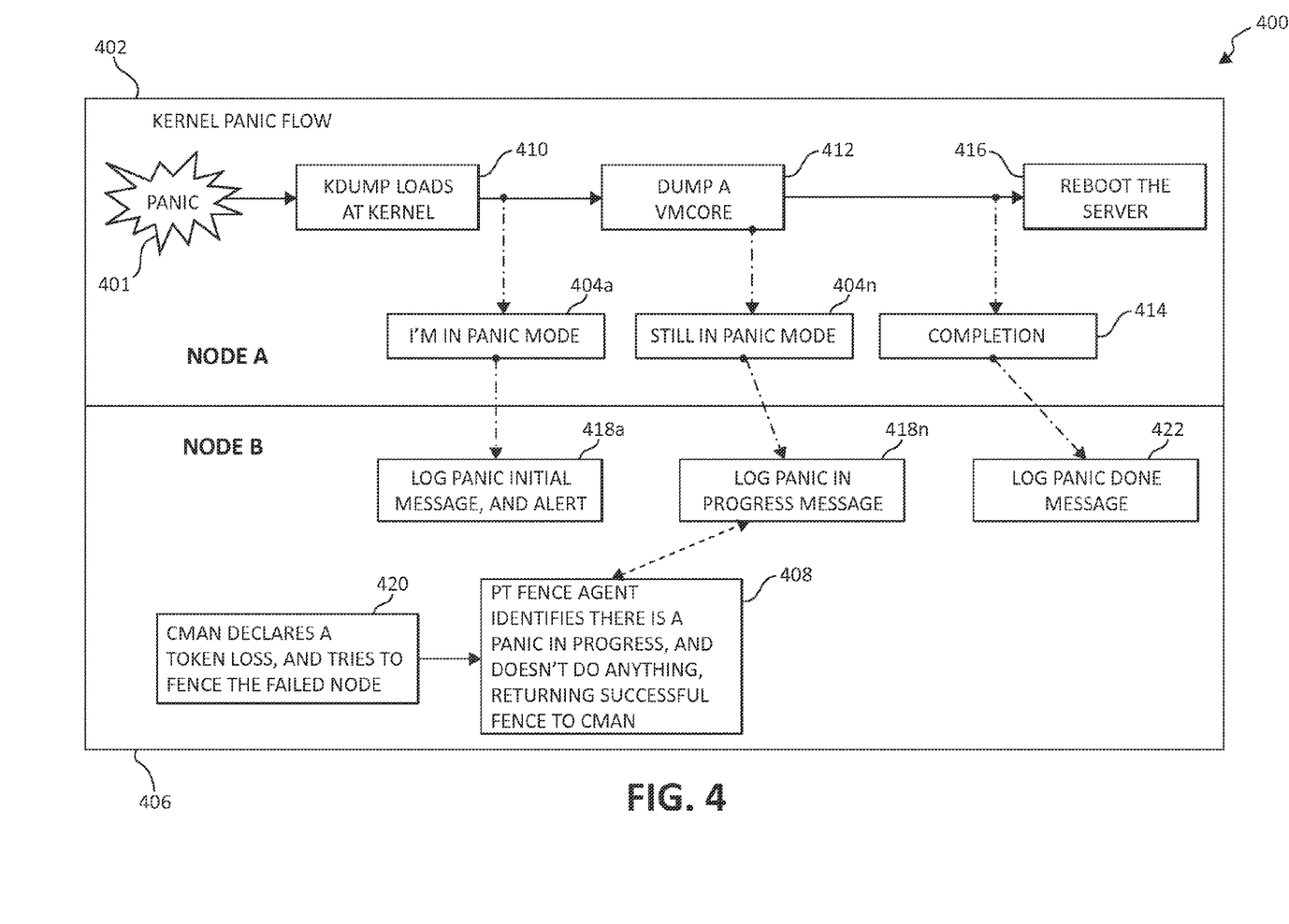
FIG. 4 is a block diagram illustrating exemplary operations for securing crash dump files without power fencing in a cluster of a plurality of nodes connected to a storage system during a panic mode.

FIG. 4 is a block diagram illustrating exemplary operations for securing crash dump files without power fencing in a cluster of a plurality of nodes connected to a storage system during a panic mode. The panicked node (node A) 402 sends a message 404 to surviving node 406 that it is in a panic mode. The panicked node 402 will continue sending this message 404 (labeled as 404a and 404n) every 10 seconds, or other predetermined time interval that is set according to user preference and/or technological capabilities. The surviving node 406 has a daemon (not shown), which receives 418 (labeled as 404a and 404n) the message 404 and marks on the disk that the message was received. The initial panic mode message 404a is logged and an alert is issued. As the panic messages 404 are continuously sent from the crashing node 402 to the surviving node 406 after the end of each predetermined time interval (e.g., 10 seconds), the additional panic messages 418n are logged and indicate the panic is still in progress. The panic messages indicate both a panic occurring in the crashing node and indicated that the capturing node is capturing the crash dump files.

A proprietary fence agent 408 (see also FIG. 2, 259) will check the time stamp of the last received message 404 when the proprietary agent is called, and if the message is recent enough (from the last 30 seconds or other predetermined time panic interval) the power fence agent request will return a successful notification to the cluster management "cman" and surviving node that the power fencing was performed on the crashing node without actually performing the power fencing. By returning a successful notification, the function that is called, exits with a return code that indicates it completed successfully. Specifically in this case, the fenced daemon calls a fence agent, which is a script, and tells the fencing agent to power fence the node. The fence agent (script) decides not to do that but exits with success, as if it was successful in fencing it.

The time interval is referred to as panic interval. After the crashing node 402 sends the first message 404a to the surviving node 406 that the crashing node is in panic state 401 the panicking node 402 and when the totem token 420 is declared as lost by the cluster management "cman", a fence agent (not shown in FIG. 4, but illustrated in FIG. 2, 257) will be called by a fenced daemon of the surviving node, and will return a successful exit code 418, although no fencing will actually take place. The "cman" is a program running on the node and when clustered, each physical server is called a node, and each has multiple software programs (processes) running at any given time. More specifically, cman is a group of processes responsible for cluster management. The diagram shows the different steps running in the context of the 2 nodes of the cluster. All blocks above the separation line represent processes and/or procedures and messages that are running in the context of the failed node, while below the line, everything is in the context of the surviving node.

The cluster management "cman" is a collection of items that make a central cluster membership and messaging system more usable. The capturing node (not shown) may continue loading/initializing 410 other needed kernel modules, such as RAID modules. In order for the crash kernel to load quickly enough and operate this flow of events, the crash kernel needs to be as "thin" as possible, i.e. include only necessary modules (drivers) for it to start, and send the panic message. Then, once the failed node is known it will not be fenced. At this point, time becomes insignificant to load other modules required to dump the vmcore file. One of these modules is the driver needed to access the disk to which it is desired to write files.

The loading/initializing 410 stage is not time sensitive and can take several minutes. The panicking node 402 dumps 412 the memory to disk, using a kdump operation, saving a virtual memory (VM) core file on the local file system. Once the crash file dump 412 has been successfully captured by a capturing node, which was loaded to the cluster, a "panic mode completion" message 414 is sent. The surviving node 406 logs 422 the panic mode completion message 414. Having sent the "panic mode completion" message 414, the panicked node 402 reboots 416 itself. After the reboot 416 the panicked node 402 raises an alert, which can be used for various monitoring functions. It should be noted that the same logic/steps used here for the 2 nodes cluster configuration in FIG. 4 may be further extended to be used in a cluster having multiple nodes. This may be accomplished by modifying the messaging method to use multicast, thus send the panic message to all members of the cluster. The messaging protocol can either send the panic message to a specific node, according to its IP address, or to a group of nodes. Sending to a specific IP address is called unicast. Sending to a group of nodes is called multicast. Sometimes multicast is referred to as broadcast, with slight variations to multicast.

At this point, and in connection with the crashing node, the lower level component details of the secondary kernel (and/or capturing kernel) are illustrated. The capturing node is loaded into the cluster to capture the crash dump file belonging to the crashing node. The capturing node, (e.g., secondary node's kernel) should support the hardware platform, by including as many modules that handle the hardware components as possible. For example, in Linux, module is the term used for what is more commonly known as drivers. Since the drivers are used to "connect" between the OS and the hardware it is running on, have as many of them enables the kernel to load on a wider variety of servers and their associated H/W components, such as network card, etc. It is critical that the network related modules are compiled into the kernel. The surviving kernel supports the kdump feature, and the overall target boot time for secondary/surviving kernel and the file system, is less than 4 seconds. The secondary kernel is a specially configured and a compiled version of the mainline kernel (it may not be the mainline kernel and could be any Linux Kernel), such as the mainline Linux kernel 3.1.0, illustrated by way of example only. In order to be used as a dump-capture kernel, the following options should be available on the kernel: 1) the kernel is relocatable (e.g., a relocatable kernel is a kernel that can be loaded from different memory addresses as opposed to non-relocatable kernels, that must be located in a specific address in the memory space. This is required for the crash kernel image to reside in a different location than the primary kernel, and still can be loaded), 2) the kernel has kexec feature compiled-in (the kexec mechanism is what actually loads the crash kernel. It is used by the kdump facility, 3) the kernel has the support for /dev/oldmem and /proc/vmcore, which is needed to convert the memory image to a dump file, 4) the kernel enable "kernel crash dumps" (the kernel needs to be capable of accessing storage, in order to save the dump file, and 5) the kernel is capable of being compiled as single-processor kernel, which is a general recommendation for kexec. Kexec is a fastboot mechanism that allows booting a kernel (e.g., a Linux kernel) from the context of an already running kernel without going through the BIOS. The BIOS can be very time consuming, especially on big servers with numerous peripherals. This can save a lot of time for developers who end up booting a machine numerous times, as well as users that require to reboot servers. The crash dump is captured from the context of a freshly booted kernel and not from the context of the crashed kernel. Kdump uses the kexec to boot into a second kernel whenever the system crashes. This second kernel (e.g., the capture kernel), boots with very little memory and captures the dump image. The first kernel reserves a section of memory that the second kernel uses to boot. In order to support as many configurations as possible and reduce the post-boot user space module loading, most of the device drivers are built into the kernel. Only slow device drivers will be handled as modules and loaded after the secondary kernel is up.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for securing crash dump files while avoiding power fencing in a cluster of a plurality of nodes connected to a storage system, the system comprising:
    a power fencing device connected to each one of the plurality of nodes in a first layer,
    a fencing agent connected to the power fencing device in the first layer in the cluster,
    a proprietary fencing agent hierarchically configured in a second layer before the fencing agent and associated with each one of the plurality of nodes,
    a processor device controlling the plurality of nodes, the fencing agent, and the propriety fencing agent, wherein processor device:
        upon an occurrence of a panic of a crashing node and prior to receiving a panic message of the crashing node by a surviving node, loads in the cluster a capturing node to become active, prior to a totem token being declared lost by the surviving node, for capturing the crash dump files of the crashing node, while manipulating the surviving node to continue to operate under the assumption the power fencing was performed on the crashing node.

2. The system of claim 1, wherein the processor device restricts the capturing node from gaining access to the storage system for preventing unsynchronized access to the storage system in order to prevent data corruption.

3. The system of claim 1, wherein the processor device continuously sends the panic message from the crashing node to the proprietary fencing agent associated with the surviving node after the end of each of a predetermined time interval, the panic message indicating both the panic occurring in the crashing node and the capturing node capturing the crash dump files.

4. The system of claim 1, wherein the processor device issues a successful notification by the proprietary fencing agent to the surviving node that the power fencing was performed by the power fencing device on the crashing node without actually performing the power fencing by the power fencing device.

5. The system of claim 4, wherein the processor device issues the successful notification by the proprietary fencing agent after both the totem token is declared a loss and the panic message is received by the surviving node.

6. The system of claim 1, wherein the processor device:
    sends the totem token from each one of the plurality of nodes to each other one of the plurality of nodes to indicate that each one of the plurality of nodes sending the totem token is active and not in a panic mode, wherein the totem token is sent after the end of every panic time interval, and
    declares the totem token as lost by the surviving node if the totem token is not received from the crashing node upon an expiration of the panic time interval.

7. The system of claim 6, wherein the processor device determines if the panic time interval has expired by checking if a time stamp of the totem token that was last received is outside of the range of the panic time interval.

8. The system of claim 1, wherein the processor device performs a reboot operation by the crashing node upon successfully capturing the crash dump files by the capturing node, wherein an end panic mode message is sent from the crashing node to the surviving node upon successfully capturing the crash dump files by the capturing node.

9. A computer program product for securing crash dump files while avoiding power fencing in a cluster of a plurality of nodes connected to a storage system using a processor device, the computer program product comprising a non-transitory computer-readable storage medium having computer-readable program code portions stored therein, the computer-readable program code portions comprising:
    a first executable portion, upon an occurrence of a panic of a crashing node and prior to receiving a panic message of the crashing node by the surviving node, that loads in the cluster a capturing node to become active, prior to a totem token being declared lost by a surviving node, for capturing the crash dump files of the crashing node, while manipulating the surviving node to continue to operate under the assumption the power fencing was performed on the crashing node.

10. The computer program product of claim 9, further including a second executable portion that restricts the capturing node from gaining access to the storage system for preventing unsynchronized access to the storage system in order to prevent data corruption.

11. The computer program product of claim 9, further including a second executable portion that continuously sends the panic message from the crashing node to the surviving node after the end of each of a predetermined time interval, the panic message indicating both the panic occurring in the crashing node and the capturing node capturing the crash dump files.

12. The computer program product of claim 9, further including a second executable portion that issues a successful notification to the surviving node that the power fencing was performed on the crashing node without actually performing the power fencing.

13. The computer program product of claim 12, further including a third executable portion that issues the successful notification after both the totem token is declared a loss and the panic message is received by the surviving node.

14. The computer program product of claim 9, further including a second executable portion that:
sends the totem token from each one of the plurality of nodes to each other one of the plurality of nodes to indicate that each one of the plurality of nodes sending the totem token is active and not in a panic mode, wherein the totem token is sent after the end of every panic time interval, and
declares the totem token as lost by the surviving node if the totem token is not received from the crashing node upon an expiration of the panic time interval.

15. The computer program product of claim 14, further including a third executable portion that determines if the panic time interval has expired by checking if a time stamp of the totem token that was last received is outside of the range of the panic time interval.

16. The computer program product of claim 9, further including a second executable portion that performs a reboot operation by the crashing node upon successfully capturing the crash dump files by the capturing node, wherein an end panic mode message is sent from the crashing node to the surviving node upon successfully capturing the crash dump files by the capturing node.

* * * * *